(12) United States Patent
Fleig et al.

(10) Patent No.: US 6,422,268 B1
(45) Date of Patent: Jul. 23, 2002

(54) VALVE SEAL FOR A VALVE UPPER PART, PARTICULARLY FOR A WATER INSTRUMENT OR FITTING

(75) Inventors: Juergen Fleig; Juergen Meier, both of Triberg (DE)

(73) Assignee: Anton Traenkle GmbH & Co. KG (DE)

(*) Notice: Subject to any disclaimer, the term of this patent is extended or adjusted under 35 U.S.C. 154(b) by 0 days.

(21) Appl. No.: 09/871,419

(22) Filed: May 31, 2001

(51) Int. Cl.⁷ ................................................ F16K 3/04
(52) U.S. Cl. ................................................. 137/625.31
(58) Field of Search ......................... 137/625.31, 625.46

(56) References Cited

U.S. PATENT DOCUMENTS

| | | | | |
|---|---|---|---|---|
| 3,831,621 A | * | 8/1974 | Anthony et al. | 137/270 |
| 4,821,765 A | * | 4/1989 | Iqbal et al. | 137/270 |
| 4,880,209 A | * | 11/1989 | Georg | 251/363 |
| 4,924,903 A | * | 5/1990 | Orlandi | 137/454.5 |
| 5,010,917 A | * | 4/1991 | Iqbal | 137/454.6 |
| 5,022,631 A | | 6/1991 | Wagner et al. | |
| 5,107,884 A | * | 4/1992 | Orlandi | 137/454.5 |
| 5,174,324 A | | 12/1992 | Chrysler | |
| 5,348,042 A | | 9/1994 | Wagner et al. | |
| 5,681,028 A | * | 10/1997 | Cook et al. | 251/170 |
| 5,732,734 A | * | 3/1998 | Buccicone | 137/454.6 |

FOREIGN PATENT DOCUMENTS

| | | | |
|---|---|---|---|
| DE | 35 38 713 A1 | 5/1987 | F16K/525/00 |
| DE | 44 27 745 A1 | 2/1996 | F16K/11/02 |
| EP | 0 423 634 A1 | 4/1991 | F16K/3/08 |
| EP | 0 565 905 A1 | 10/1993 | F16K/3/08 |

* cited by examiner

*Primary Examiner*—John Fox
(74) *Attorney, Agent, or Firm*—Pendorf & Cutliff

(57) ABSTRACT

Sealing device for a valve upper part (18) comprised of a valve housing (20) and a spindle (22) rotatable therein, in particular for plumbing fixtures. The sealing device is comprised of a base disk (32) fixedly associated with the valve housing (20) and a control disk (34) which lies rubbing against the base disk and controlling the water flow through the valve upper part (18). The base disk (32) and control disk (34) are produced from ceramic or ceramic type material. A sealing surface of the base disk (32) facing away from the control disk is held urged against a sealing ring (36) of rubber or rubber like material. The sealing surface is formed by a ring shaped projecting edge part (38) on the base disk (32) or, as the case may be, on the sealing ring (36), and a groove (40) complementary to the edge part (38) defined in the sealing ring (36) or, as the case may be, a receiving groove (64) in the base disk (32).

5 Claims, 7 Drawing Sheets

VALVE SEAL FOR A VALVE UPPER PART, PARTICULARLY FOR A WATER INSTRUMENT OR FITTING

BACKGROUND OF THE INVENTION

1. Field of the Invention

The invention concerns a seal for a valve upper part, in particular for a water appliance or fixture.

A valve upper part of this type is particularly useful for water, but could in principle however also be used for other fluids. Accordingly, when mention is made of water in the following and in the claims, it is to be understood that this term is intended to include also other fluids, for which the valve upper part is useable.

A sealing device is used for example in plumbing fixtures, wherein by means of axial displacement of control disk relative to a fixed base disk, such that when the valve is in the closed condition the flow-through of water is prevented, and when the valve formed by these disks is in the partial or completely opened condition, allows a controlled flow or flow-through of water.

2. Description of the Related Art

In known valve upper parts, for example in the valve upper part known from U.S. Pat. No. 5,184,324, the base disk and control disk are comprised of ceramic, which has the advantage that this material is almost completely friction-resistant, so that at least this part of the valve upper part, which is particularly strongly subjected to wear, exhibits an almost unlimited life duration. In place of ceramic it is possible naturally also to use a series of other hard and wear-resistant materials. The base disk is fixed against rotation in the valve housing in known manner by suitable devices, while the control disk, seated freely rotatable upon the base disk, is connected fixed against rotatation with a spindle. The valve comprised of base disk and control disk is operated by the rotation movement of the spindle or, as the case may be, the therewith connected handle or the like.

The seal between the seat of the fixture body and the valve upper part occurs via a rubber ring, which is fixed in the headpiece of the valve upper part, and seals by compression against the base disk or, as the case may be, the seat of the fixture body.

As long as the valve upper part is not assembled in the instrument or fixture body, the friction resistance between the base disk and control disk has no great significance, since the valve is more or less easy to operate. Only after the incorporation or assembly of the valve upper part in the instrument or fixture body does the resistance during rotation of the control disk become significant as a result of axial pressing or compression. The operation forces or, as the case may be, torsional forces during opening and closing of the valve have a substantial influence upon the ease of operation of the instrument or fixture. On the one hand, the valve should be easy to manipulate, so that the valve can be opened and closed both with handles and well as with round hand grips, on the other hand, a certain amount of resistance should be present, in order to be able to select an exact water metering. In the case of a wall installation utilizing handles, a certain amount of resistance is in fact highly necessary, so that the valve cannot open by itself.

A predefined resistance or, as the case may be, axial force corresponding to the specific appliance or fixture is besides this of advantage for the reason that this resistance also has an influence upon the ceramic disks rubbing upon reach other and otherwise also upon the axial slide ring present in such a valve upper part, whereby the eventual wear is minimized. This contributes likewise to a lengthening of the lifespan and product reliability.

It is expected that instruments or fixtures or as the case may be valves of this type are designed to withstand 200,000 to 500,000 cycles, all the while maintaining approximately constant operation force and smooth, jerk-free movement. In the past it was attempted to influence of the movement forces by various shapes, hardness and material quality of the seal devices, in order on the one hand to guarantee the water-tightness and on the other hand to achieve the optimal torsional forces. It has however been found in practice that this is not necessary, or only in certain conditions. The seat of the fixture body as well also the valve upper part, which are comprised of multiple construction components, have tolerances, which collectively influence the axial compression occurring at the sealing device. If one selects a soft or, as the case may be, filigreed seal, then one has a low friction resistance in the radial plane, however there is the danger of the breech of the water-tightness of the valve. This danger occurs in particular in the case of very diverse water pressures. Particularly in the case of small pressures or compressions and already mentioned filigreed seals there exits the danger that as a result of the low self-compression a lack of water tightness may result. There are diverse seat shapes, such as for example the step seat, which exercise a negative influence upon the above mentioned seal combination. Besides this, there can be caused pressure surges or pulses when a soft seal only has limited resistance. If one selects a harder material for the seal device, one achieves on the one hand an optimal compression; however, as a result of possible summation of tolerances so much pressure could be exerted upon the hard disks, in particular ceramic disks, that the torsional forces drastically increase. A substantial reason therefore lies in the fact, that the axial compression via the seal ring is transmitted surface-wise directly upon the base disk and therewith also upon the control disk and the slide ring.

SUMMARY OF THE INVENTION

The present invention begins at this point. It concerns the provision of a sealing ring for a valve upper part of this type, which is so designed, that also in the case of unsuitable tolerances (largest dimensions/smallest dimensions) a sufficient axial compression can be achieved, in order to guarantee the sealing of the valve, and at the same time a comfortable torque friction is provided between the valve disks for operation or manipulation.

This task is inventively solved in a seal device for a valve upper part (18) comprised of a valve housing (20) and a spindle (22) rotatable therein, in particular for plumbing fixtures. The sealing device is comprised of a base disk (32) fixedly associated with the valve housing (20) and a control disk (34) which lies rubbing against the base disk and controlling the water flow through the valve upper part (18). The base disk (32) and control disk (34) are produced from ceramic or ceramic type material. A sealing surface of the base disk (32) facing away from the control disk is held urged against a sealing ring (36) of rubber or rubber like material. The sealing surface is formed by a ring shaped projecting edge part (38) on the base disk (32) or, as the case may be, on the sealing ring (36), and a groove (40) complementary to the edge part (38) defined in the sealing ring (36) or, as the case may be, a receiving groove (64) in the base disk (32).

If the valve upper part provided with this seal device is screwed into the fixture body, then the edge part of the base disk penetrates into the soft rubber or the like of the seal ring, whereupon the groove remaining in the rubber lies against the flanks of the edge part. When on the other hand the base disk of ceramic or the like is provided with such a groove, then the rubber ring is provided with the projecting elastic edge part, which during screwing in of the valve upper part to the fixture body is pressed sealingly into the groove.

The axial compression thus does not act surface-wise directly upon the ceramic disk surfaces lying against each other, but rather via the edge part, which projects ending in an edge, and via the flanks thereof. Even the most unsuitable tolerances can be equalized therewith. As a result of the triangular shape design of the edge part, a distribution of the axial compression transmission occurs. On the basis of the axial pressure transmission by means of the edge part, the seal integrity of the valve can be guaranteed at any time, without however any noticeable increase in the axial pressure and thus the friction forces to be overcome during operation of the valve. At the same time as a result of this rubber/ceramic connection a supplemental stabilization of the ceramic base disk can be achieved.

The friction forces between base disk and control disk can be adjusted by changing the depth of submerging of the edge part in the seal ring.

In a preferred embodiment a reinforcing ring embedded in the rubber ring makes it possible in simple manner to adjust the depth of penetration of the edge part of the opposite lying groove.

BRIEF DESCRIPTION OF THE DRAWINGS

On the basis of the figure, preferred embodiments of the invention are described in greater detail. There is shown in.

DETAILED DESCRIPTION OF THE INVENTION

Figure 1:
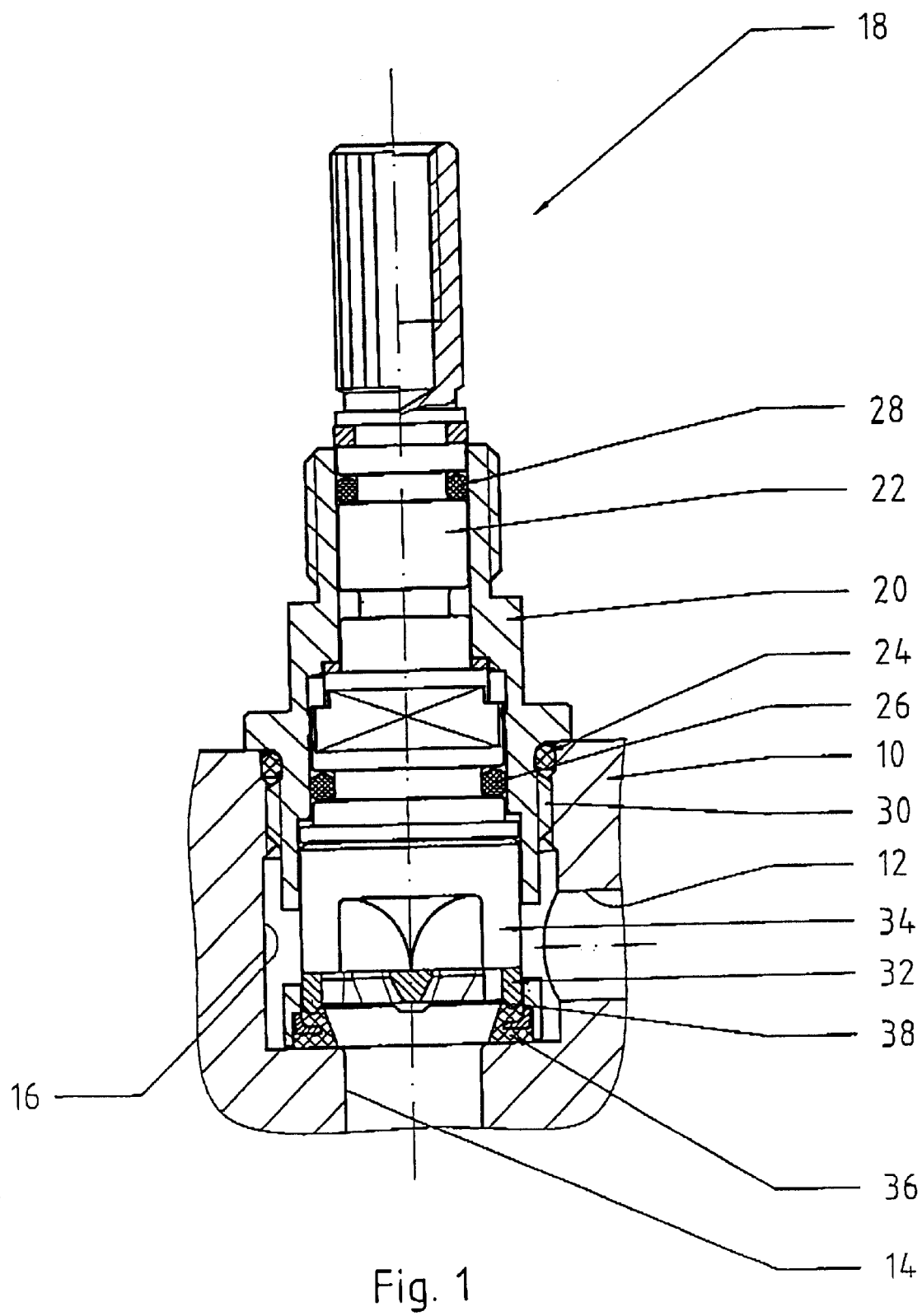
FIG. 1 an axial section through a valve upper part assembled into a fixture body with the inventive seal device, FIG. 2 an axial section through the valve upper part shown in FIG. 1 in disassembled condition, FIGS. 3 through 5 enlargement of the part shown in the circle III in FIG. 2 during different represented penetration depths of the edge part into the opposite lying seal ring, FIG. 6 a view upon the ceramic base disk represented in FIGS. 1 through 5 with edge part formed thereon, FIG. 7 a sectional along lines VII—VII in FIG. 6, FIG. 8 a view of alternative embodiment of the ceramic base disk with grooves, FIG. 9 a section through lines IX—IX in FIG. 8 and FIG. 10 an axial section through the rubber ring associated with the base disk according to FIG. 8 and 9 with projecting edge part.
Figure 2:
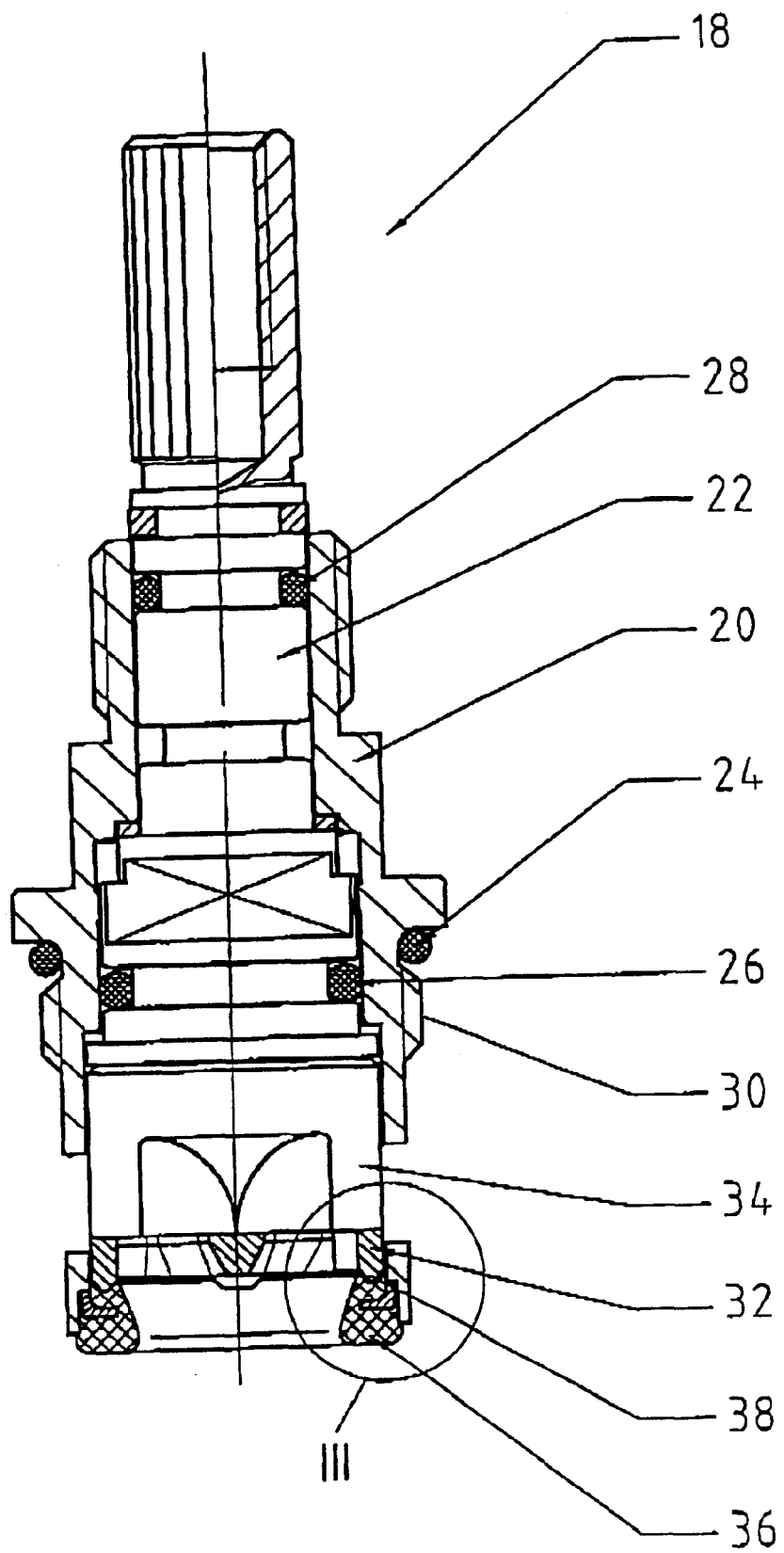

The fixture indicated in general with 10, with water inlet 14 and water outlet 12, includes a hollow space 16, into which the lower end of a valve upper part indicated in general with 18 according to FIG. 1 is introduced. The valve upper part includes a valve housing indicated in general with 20 and a spindle mounted rotatably therein and indicated in general with 22. Fixture 10, valve housing 20 and spindle 22 are sealed with respect to each other in known manner via O-rings 24, 26 and 28.

The valve housing 20 is screwed into the hollow space 16 via a helical threading 30. In the lower section of the valve upper part 18 there is a valve comprised of a ceramic base disk 32 and a control disk 34 lying flush there-against. By rotating or turning the spindle 22 in the valve housing 20 there can be selectively, and thus stationary, adjusted the gap or opening between the control disk 34 and the base disk 32 connected to the valve housing 20, and therewith a greater or lesser amount of water throughput through the valve. In this embodiment, base disk 32 and control disk 34 are preferably comprised of ceramic.

On the lower side of the base disk 32—the side facing away from the control disk 34—there lies a sealing ring 36 with basically approximately trapezoid shaped cross-section, in sealing engagement. This lower side of the base disk 32 is formed in the embodiment represented in FIGS. 1 through 7 by a downwards-projecting edge part 38 with approximately triangular cross-section. By a more or less strong screwing in of the valve upper part 18 into the hollow space 16 of the fixture body 10 the sealing ring 36 is compressed more or less strongly in the hollow space 16, whereby the edge part 38 presses itself more or less deep into the soft rubber seal ring 36 with formation of a more or less deep groove 40. The primarily pressure force between base disk 32 and seal ring 36 distributes itself thereby essentially along the edge 42 and in the flanks of the edge part 38 so that a pressing force results between base disk 32 and seal ring 36 which is, on the one hand, basically adjustable, and on the other hand however, more or less softly yielding.

The essentially planar flanks 44 and 46 of the edge part 38 form, together with the groove 40 formed in the seal ring 36, a sealing surface, which provides an excellent sealing between base disk 32 and seal ring 36.

Figure 3:
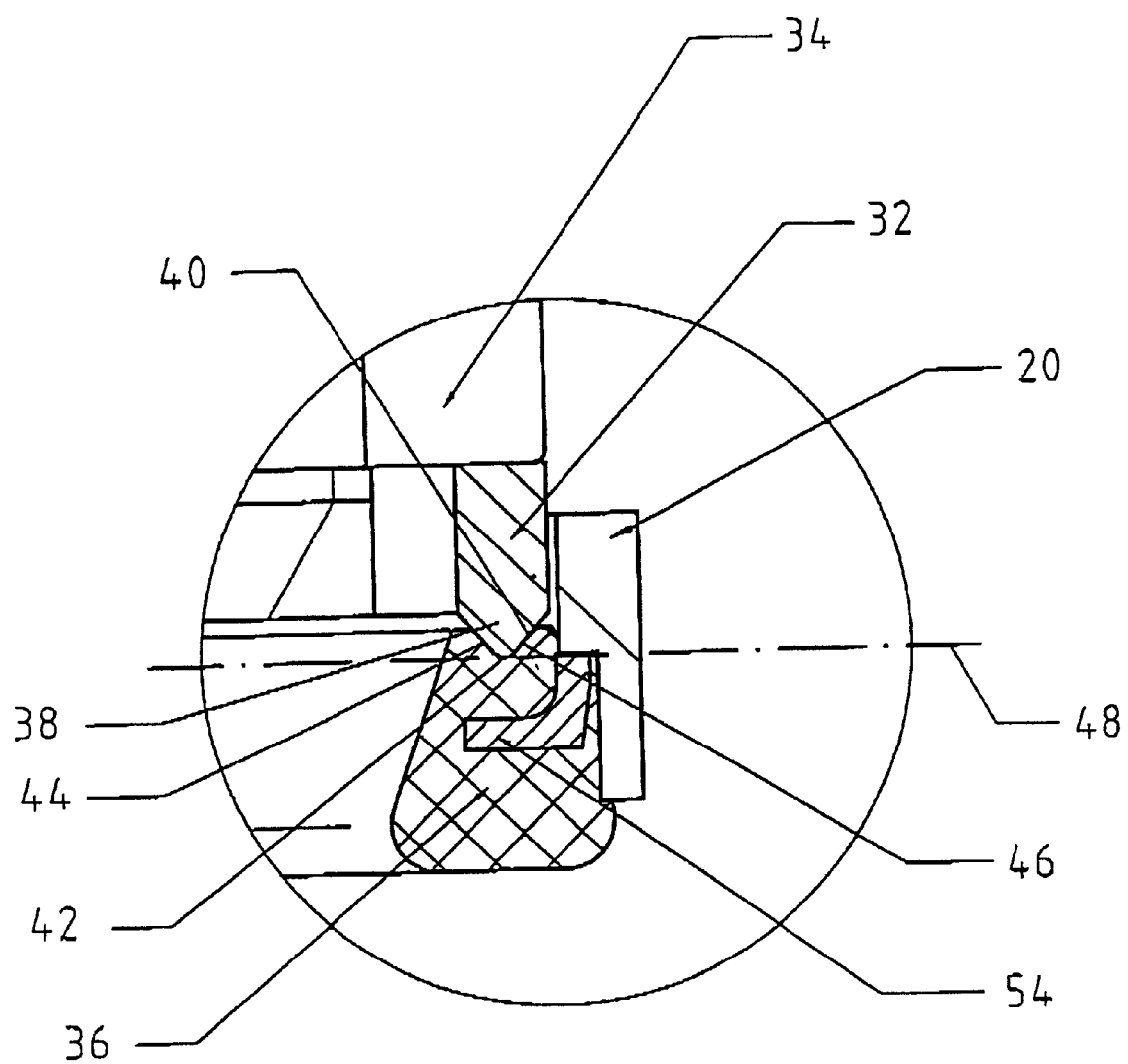

In FIG. 3 a situation of the control disk 34, base disk 32 and seal ring 36 of the inventive seal device is represented during central or middle axial pressure, in which the edge 42 of the edge part 38 is submerged to a level 48 in the seal ring 36. In the situation shown in FIG. 4 the adjusted axial pressure is somewhat less, so that the edge 42 of the edge part 38 is submerged only to a level 50 in the seal ring 36. In comparison a somewhat stronger axial pressure situation is represented in FIG. 5, wherein the edge 42 of the edge part 38 is submerged to a level 52 lying below the level 48 in the soft seal ring 36. In the illustrated construction or assembly situation according to FIGS. 3/4/5, the axial pressure between seal 36 and base disk 32 can be neutralized in accordance with the inventive embodiment of the edge part 38, and therewith also between base disk 32 and control disk 34, since the resulting axial pressure is distributed via the flanks of the edge part 38.

Figure 4:
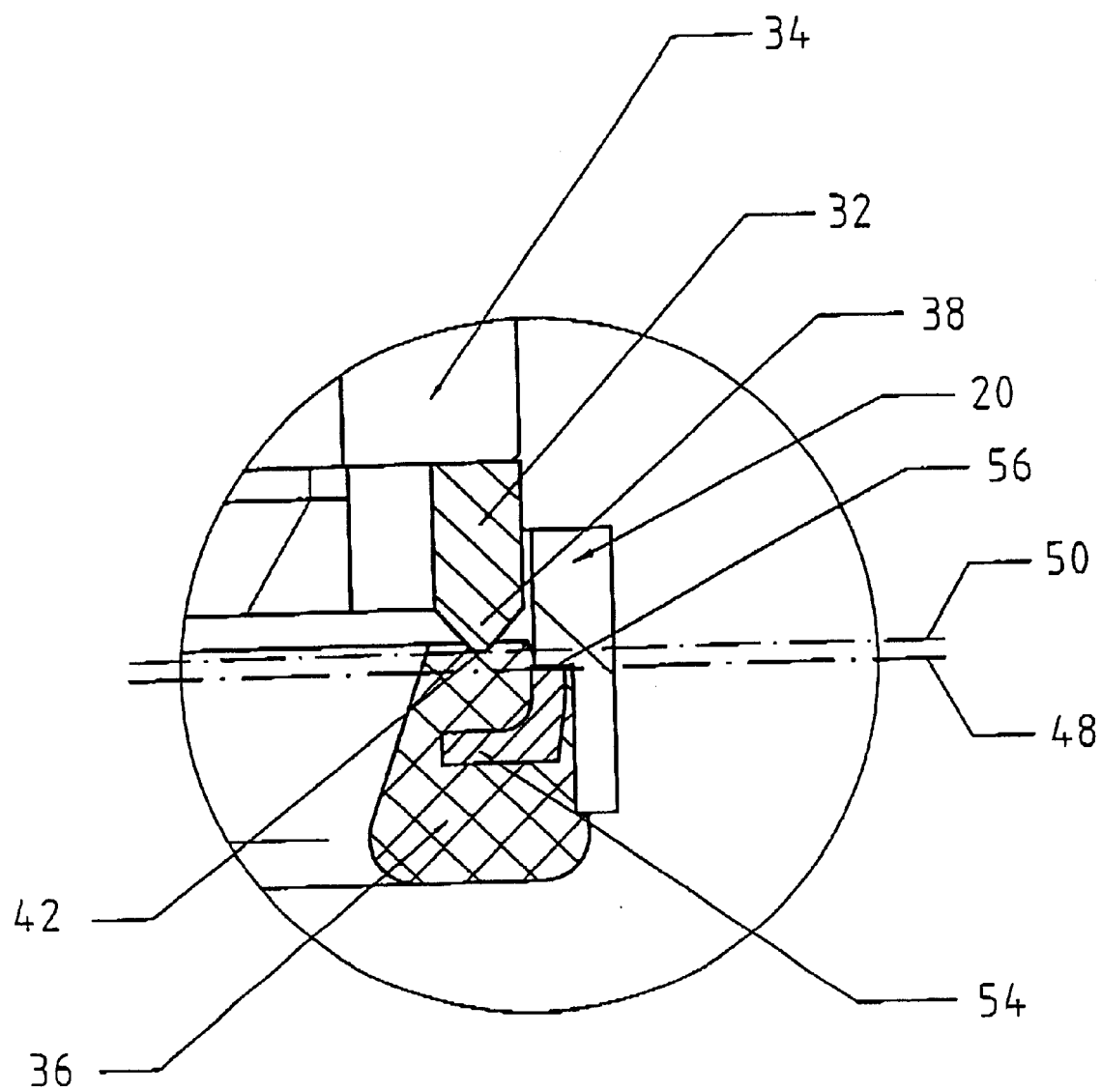
Figure 5:
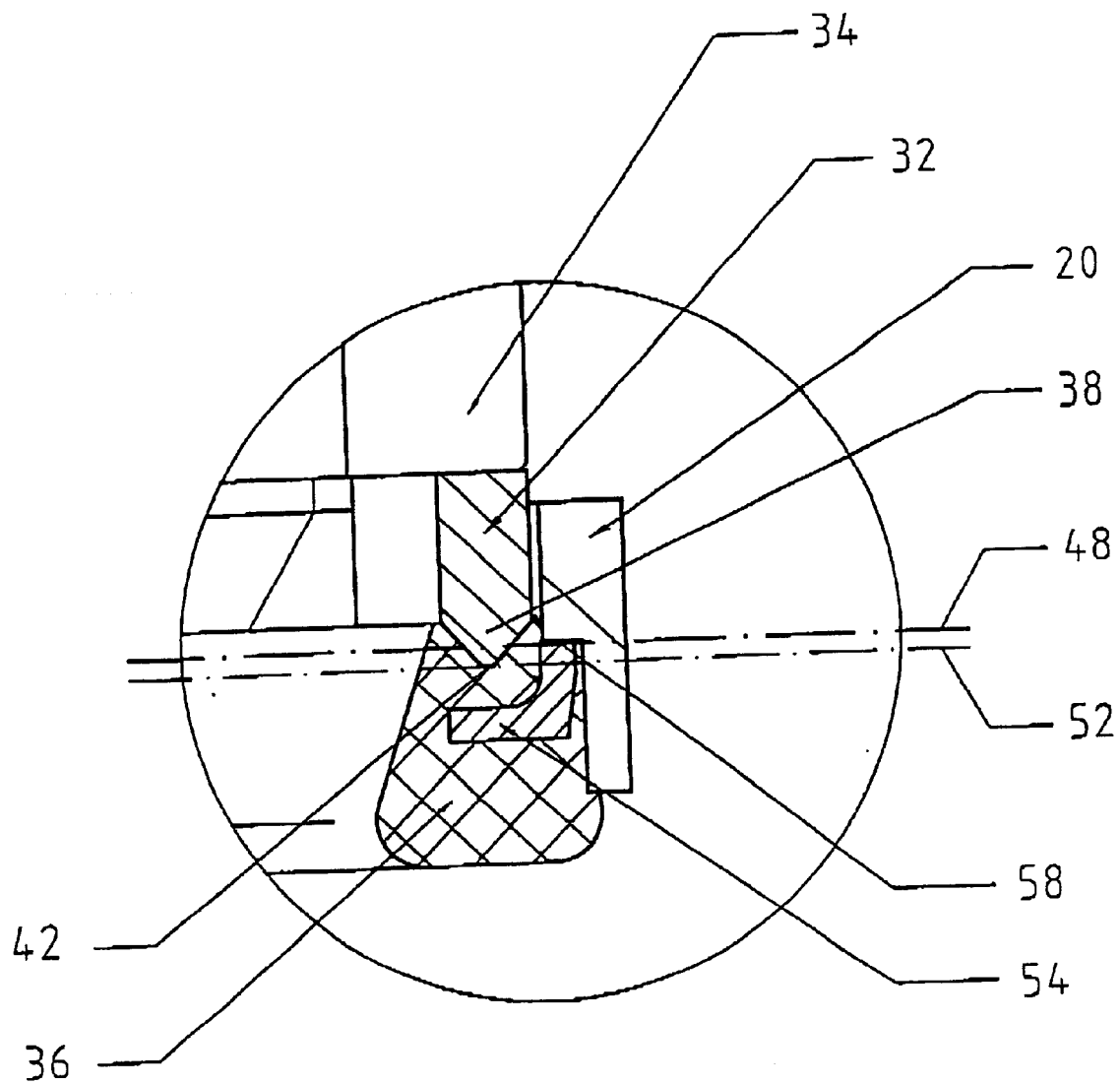

In addition it can be seen from FIGS. 3 through 5 that a reinforcing ring 54 of stiff material, preferably metal, is embedded in the rubber ring 36 with angled profile in such a manner that an upward projecting support surface 56 is formed, which is supported upon a downward directed shoulder 58 of the valve housing 20. Thereby a defined penetration of the edge 42 of the edge part 38 into the rubber sealing ring 36 is guaranteed, since the seal ring 36 is fixed in the valve housing 20.

Figure 6:
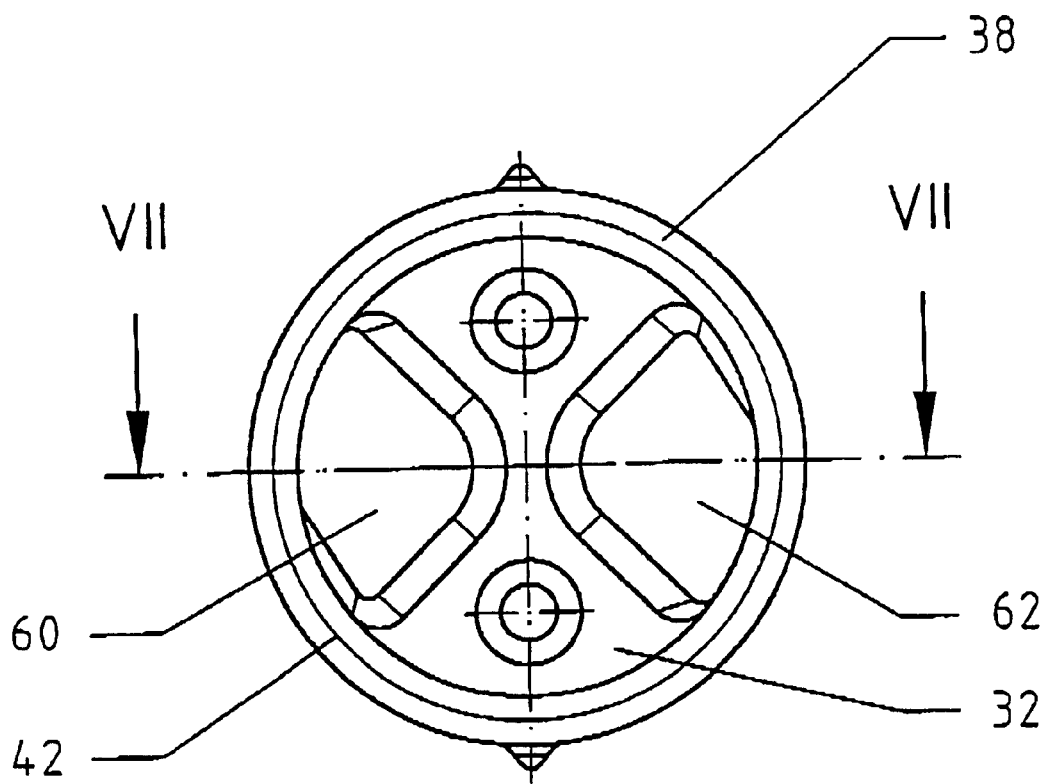
Figure 7:
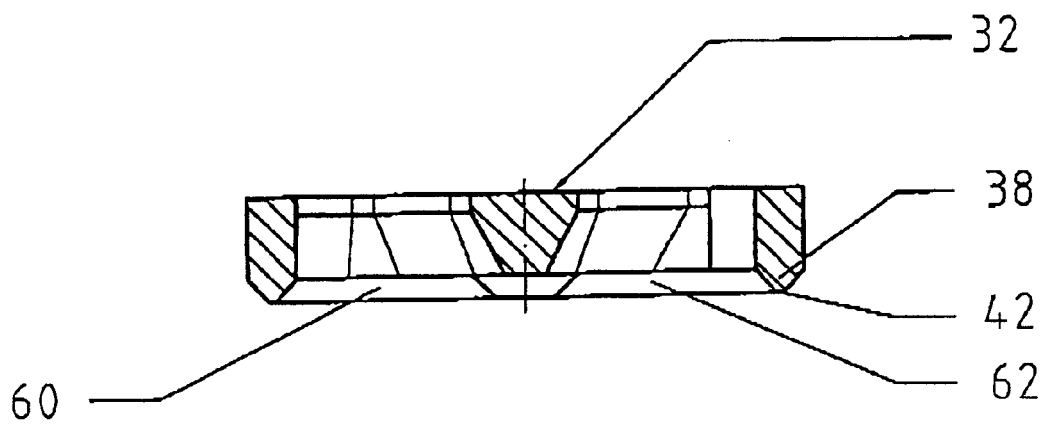

From FIGS. 6 and 7 the shape of the base disk 32 with two diametrically oppositely lying openings 60 and 62 for selective passage of water at particular rotation positions of the control disk 34 can be seen. At the circumference edge of the base disk 32 the edge part 38 with its edge 42 can be seen.

Figure 8:
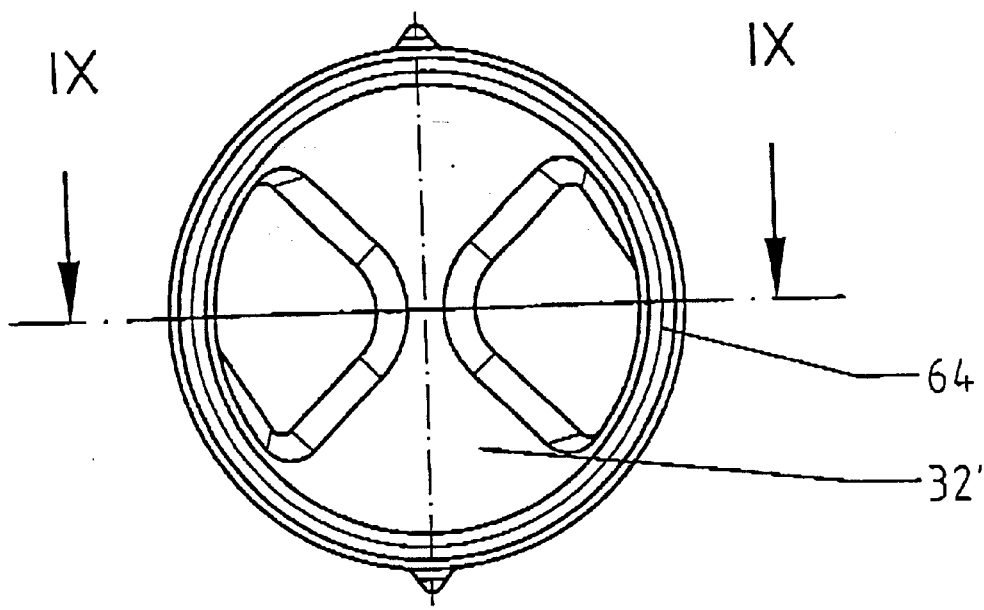
Figure 9:
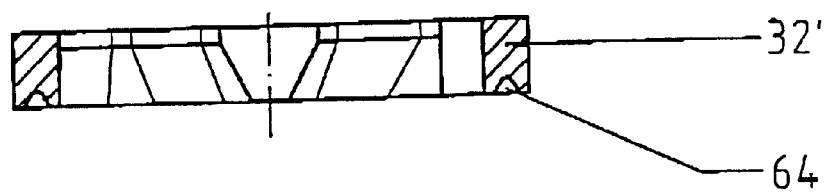
Figure 10:
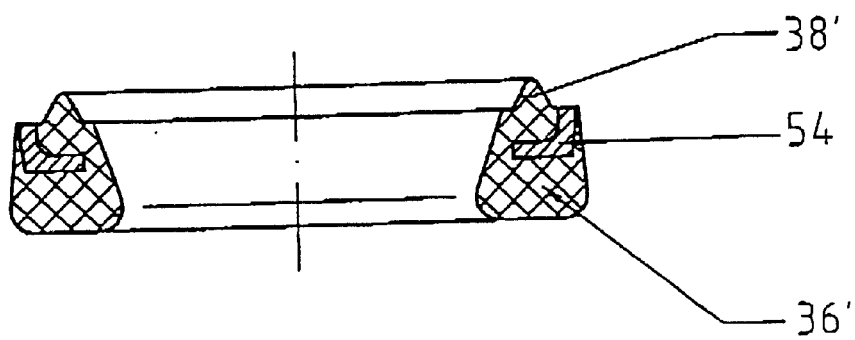

An alternative embodiment of base disk and seal ring is illustrated in FIGS. 8 through 10. In this embodiment the base disk 32' is provided on its circumference with an annular shaped groove 64 formed into the ceramic material, while the rubber ring a seal 36', as shown in FIG. 10, includes in this embodiment an upward projecting edge part 38', likewise with approximately triangular cross-section, which is pressed during screwing in of the valve upper part 18 into the hollow space 16 of the fixture body 10 into a groove 64 exhibiting a similar cross-section, such that a superior seal between base disk 32' and seal ring 36' results, as well as an adjustable, however springy yielding axial pressure between base disk 32' and seal ring 36'.

What is claimed is:

1. A sealing device for a valve upper part comprised of a valve housing and spindle rotatable therein between end positions, wherein the sealing device comprises:

a base disk (32) adapted to be fixedly associated with the valve upper part, a control disk (34) which lies rubbing against the base disk and adapted for controlling the water flow through the valve upper part, wherein the base disk (32) and control disk (34) are produced from ceramic or ceramic type material, wherein the base disk (32) includes a sealing surface facing away from the control disk and held urged against a sealing surface of a sealing ring (36) of rubber or rubber like material, wherein one of said base disk and sealing ring sealing surfaces includes a ring shaped projecting edge part, and wherein the other of said base disk and sealing ring sealing surfaces includes a ring shaped groove complementary to said projecting edge part.

2. A sealing device according to claim 1, wherein said edge part is approximately triangular in cross-section.

3. A sealing device according to claim 1, wherein said edge part is provided on the base disk (32) and the groove is formed in the sealing ring (31) by the pressing in of the edge part (38) into the sealing ring (36) by axial pressure force.

4. A sealing ring according to claim 1, wherein the friction force between base disk (32) and control disk (34) is elastically yielding by adjustment of the axial pressure between base disk (32, 32') and sealing ring (36, 36').

5. A sealing device according to claim 1, wherein a reinforcing ring (54) is embedded in the sealing ring (36, 36') supporting a shoulder (58) of the valve housing (20).

\* \* \* \* \*